(12) United States Patent
Corradini

(10) Patent No.: US 10,282,947 B2
(45) Date of Patent: May 7, 2019

(54) DEVICE FOR SIGNALING DIRECTION

(71) Applicant: Davide Corradini, San Lazzaro di Savena (IT)

(72) Inventor: Davide Corradini, San Lazzaro di Savena (IT)

( * ) Notice: Subject to any disclaimer, the term of this patent is extended or adjusted under 35 U.S.C. 154(b) by 0 days.

(21) Appl. No.: 15/768,239

(22) PCT Filed: Oct. 13, 2016

(86) PCT No.: PCT/IB2016/056125
§ 371 (c)(1),
(2) Date: Apr. 13, 2018

(87) PCT Pub. No.: WO2017/064638
PCT Pub. Date: Apr. 20, 2017

(65) Prior Publication Data
US 2018/0300993 A1 Oct. 18, 2018

(30) Foreign Application Priority Data
Oct. 15, 2015 (IT) .......................... 102015000062260

(51) Int. Cl.
*A42B 3/06* (2006.01)
*B62J 6/00* (2006.01)
*G08B 5/00* (2006.01)

(52) U.S. Cl.
CPC .............. *G08B 5/004* (2013.01); *A42B 3/066* (2013.01); *B62J 6/005* (2013.01); *B62J 2006/006* (2013.01)

(58) Field of Classification Search
CPC .... A42B 3/0453; B60Q 1/2676; F21V 23/003
See application file for complete search history.

(56) References Cited

U.S. PATENT DOCUMENTS

| 6,992,572 | B1 | 1/2006 | Lovegrove |
| 2007/0147027 | A1 | 6/2007 | Chuang |
| 2013/0128046 | A1* | 5/2013 | Gindin .................. G07C 5/0891 348/148 |
| 2014/0118129 | A1* | 5/2014 | Hutchens ................ B62J 6/003 340/432 |
| 2014/0210609 | A1* | 7/2014 | Yang .................... B60Q 1/2676 340/463 |
| 2014/0285355 | A1 | 9/2014 | Matte et al. |

FOREIGN PATENT DOCUMENTS

| CN | 204279746 U | 4/2015 |
| DE | 10 2010 020926 A1 | 12/2011 |
| DE | 20 2013 102520 U1 | 6/2013 |
| KR | 20140069503 A | 6/2014 |
| WO | 2005/034663 A1 | 4/2005 |
| WO | 2011/129740 A1 | 10/2011 |

* cited by examiner

*Primary Examiner* — Fabricio R Murillo Garcia
(74) *Attorney, Agent, or Firm* — McGlew and Tuttle, P.C.

(57) ABSTRACT

The device for signalling direction comprises a support (2) predisposed to be worn by a user and carrying at least a first direction light source (50) and a second direction light source (50), each indicating a respective rotation direction of said wearable support (2). At least one sensor element is associated with the support (2) to measure at least a value of the acceleration and/or a value of the angular speed assumed by the wearable support (2).

15 Claims, 4 Drawing Sheets

DEVICE FOR SIGNALING DIRECTION

TECHNICAL FIELD

The present invention concerns a device for signalling direction, in particular for cyclists.

BACKGROUND ART

It has been known the need to increase the safety of people who use the bicycle as a means of transport.

A first aspect to be considered is represented by the visibility of the cyclist who, in case of poor light or adverse weather conditions such as the presence of fog, mist or rain, is particularly reduced. For this reason, bicycles are generally provided with one or more position lights to signal the presence of the cyclist. In addition, cyclists wear clothing such as vests or high visibility reflective suspenders, mandatory in poor visibility conditions.

A further need of a cyclist is to warn road users of his intention to change direction. Cyclists generally signal the turning by laterally opening the arm associated with the turning direction. This can be dangerous as the cyclist does not temporarily hold the handlebar with both hands, resulting in less control of the bicycle and less stability.

Solutions have been devised that enable the cyclist to signal the turning in a safer condition.

KR 20140069503 discloses a device for signalling direction for a bicycle comprising a lever integral to a lower portion of a stem of the handlebar. The device also comprises a pair of sensors associated with a support member of the stem predisposed to detect the direction of rotation of the lever and to send control signals to a control unit. The control unit, based on the signals sent by the sensors following the rotation of the stem, controls the turning on and off of direction lights corresponding to the direction of turning.

The above-mentioned device uses the movement of the handlebar to turn on the lighting of the direction lights, therefore, it does not allow to signal the turning in advance.

CN 204279746 U describes a navigation system for a bicycle comprising a series of direction lights and stop lights and a manual control device, preferably associated with the bicycle handlebar, by which the cyclist turns on the above-mentioned lights depending on the desired operations.

Despite the higher level of safety achieved in the field, there still remains the problem of efficiently signalling the turning in advance without engaging the hands of the cyclist.

A further complained problem is that it is often necessary to mount the device on the bicycle or make changes to the bicycle itself to make the device working.

DISCLOSURE

The task of the present invention is that of solving the aforementioned problems, devising a device for signalling direction that allows to signal the turning in an easy, safe and effective way.

Within such task, a further scope is to provide a device with reduced size and easy to wear.

Another scope of the present invention is to provide a device that allows to signal a change of direction in appropriate advance with respect to the execution of the turning so as to promptly warn the users of the road.

A further scope of the invention is to provide a device for signalling direction of simple constructive and functional conception, provided with surely reliable functioning, versatile use as well as relatively economic cost.

The cited scopes are reached according to the present invention by the device for signalling direction according to claim 1 and by the method for signalling direction according to claim 12.

The device for signalling direction comprises a wearable support intended for being fastened to the head of a user, on which said support is worn in use; at least a first direction light source and a second direction light source, each indicating a respective rotation direction of the said wearable support; at least one sensor element associated with said wearable support, to measure at least a value of the acceleration and/or a value of the angular speed assumed by said wearable support when it is worn on said part of the body; a control unit electrically connected to said first direction light source and to said second direction light source, said at least one sensor element being configured to send said measured values to said control unit; said control unit being configured to process an angular measurement of the rotation performed by said wearable support ad to control, upon exceeding predetermined values of said rotation angular measurement, the selective turning on and/or off of said first direction light source and of said second direction light source so as to signal the direction of said rotation identified by said angular measurement.

Preferably, said first and second light source, said at least one sensor element and said control unit are housed on said wearable support.

Preferably, the device comprises an electric power supply device housed in the wearable support.

Preferably, the electric power supply device comprises and electric battery.

Preferably, the battery is periodically rechargeable by connecting the device to an electric power source.

Preferably, the device comprises at least one socket of the µUSB type, predisposed to allow, through connection means, the above-mentioned connection with an electric power supply source.

Preferably, the device comprises at least one position light source, configured to selectively signal the state of charge of said power supply device or the position of the user.

Preferably, the at least one position light source is arranged in a central zone of the support, interposed between the first and the second direction light source.

Preferably, the device comprises a plurality of position light sources, the number of said turned-on position light sources being indicative of a pre-established percentage of charge of said power supply device.

Preferably, the first and the second direction light sources and the at least one position light source are LEDs, so as to optimize the power consumption.

Preferably, the support has a flattened profile and shapes opposite end portions, symmetric with respect to a median axis, each defining a V turned inwardly.

Preferably, the first and the second direction light sources are placed at opposite portions of the support with respect to the median axis so as to be easily associated with the possible turning directions of the user.

Preferably, the device has a plurality of direction light sources which define, at each end portion of the support, the profile of a V, so as to simulate an arrowhead shape turned towards a side direction.

Preferably, the V profiles defined by the direction light sources are parallel to the V profile shaped by the edges of the side end portions of the support.

The described configuration is particularly advantageous as it allows to maximize the visibility and the effectiveness of the of the direction light sources that should be immediately identifiable and as far away as possible from the centre of the wearable support, and at the same time allows to minimize the size and weight of the wearable support.

Preferably, the at least one sensor element comprises an accelerometer. According to an advantageous aspect of the invention, the device comprises an accelerometer and a gyroscope predisposed to detect respectively the acceleration and the angular speed of the support.

Preferably, the device comprises at last one brightness sensor predisposed to detect the brightness level of the external environment and to transmit such value to the control unit to enable the adjustment of the brightness intensity of the direction light sources and of the at least one position light source.

Preferably, the support has coupling means, of the hook or belt loop type, for joining with joining means of the type of a band of elastic material, a suspender or the like.

According to an aspect of the invention, the device is mounted in removable manner on a bike helmet through said coupling means and said joining means.

According to an aspect of the invention, the device is worn in use directly on the head of the user, through said joining means.

According to an aspect of the invention, the device is integral to a bike helmet.

Preferably, the support is made of an impermeable material or is suitably covered with a layer of waterproofing material.

According to an aspect of the invention, it is also provided an acoustic signalling device configured so as to combine the emission of a specific sound with the turning on and off of the light sources.

The present invention concerns as well a method for signalling direction, in particular for cyclists, that provides to set a wearable support of a device for signalling direction onto the head of a user, and, optionally, turn on at least one direction light source associated with the wearable support for signalling the position of the user. Subsequently, the method provides to turn the wearable support to a first side direction, corresponding to a turning direction of the user. The method provides then to measure the rotation of the wearable support to the first side direction, and, in case the angular measurement of the rotation exceeds a predetermined threshold value for a reference time interval, to turn on at least one direction light source, associated with the wearable support and corresponding to the side turning direction, for an activation time interval, and to turn off said at least one position light source. Finally, in case after such activation time interval the direction light source is still turned on, the method provides to turn off said direction light source and optionally to turn on said at least one position light source.

Preferably, the method provides to turn off the direction light source and to turn on the at least one position light source in case, in said activation time interval, the angular measurement of the rotation of the wearable support in a second direction exceeds predetermined threshold values for a reference time interval.

Preferably, the second direction is substantially perpendicular to the first side direction and corresponds to a forward or backward direction.

Preferably, the method provides then the step of setting the device on a power saving mode in case no rotations are detected in said wearable support for an inactivity time interval.

Preferably, before the step of turning on at least one position light source, the method comprises the step of setting at least one of said light sources to indicate the state of charge of the power supply device for a signalling time interval, so as to signal the charge percentage of the power supply device.

DESCRIPTION OF DRAWINGS

Details of the invention shall be more apparent from the detailed description of a preferred embodiment of the device for signalling direction according to the invention, illustrated for indicative purposes in the attached drawings, wherein.

BEST MODE

Figure 1:
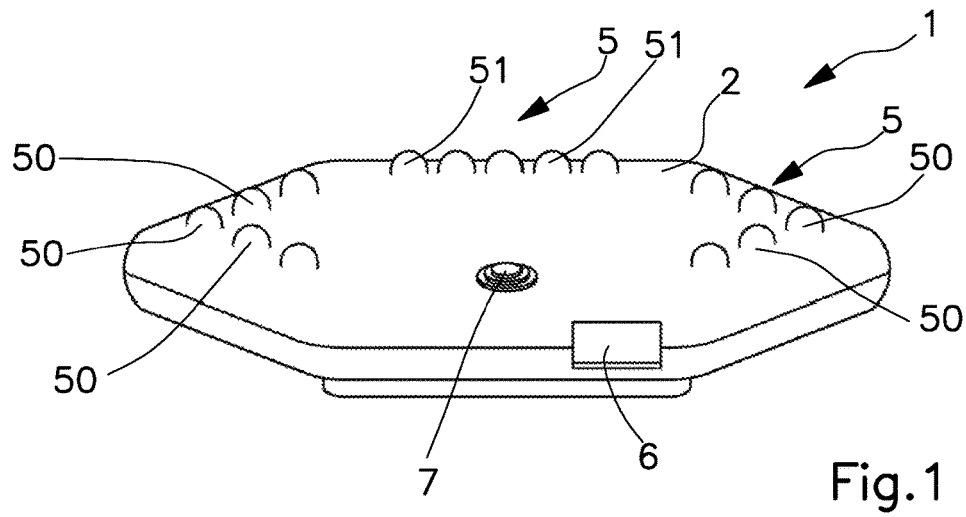
FIG. 1 shows a perspective view of the device according to the invention.
Figure 2:
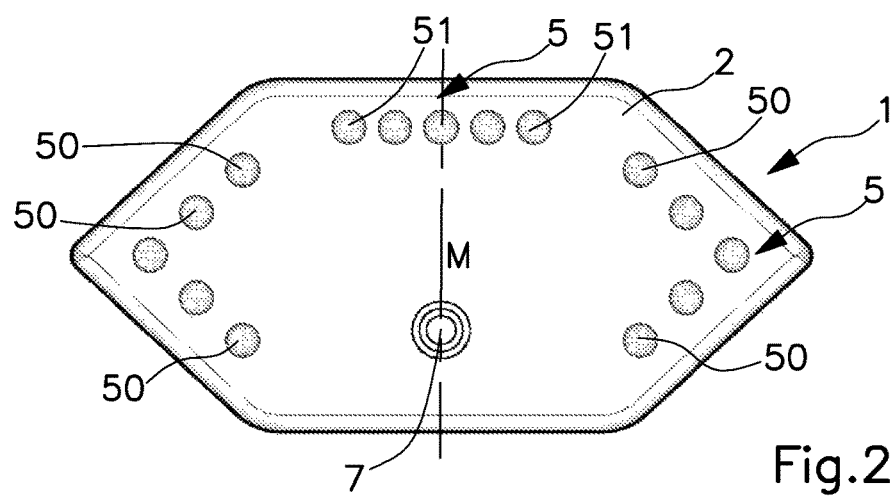
FIG. 2 shows a front view of the device.
Figure 9:
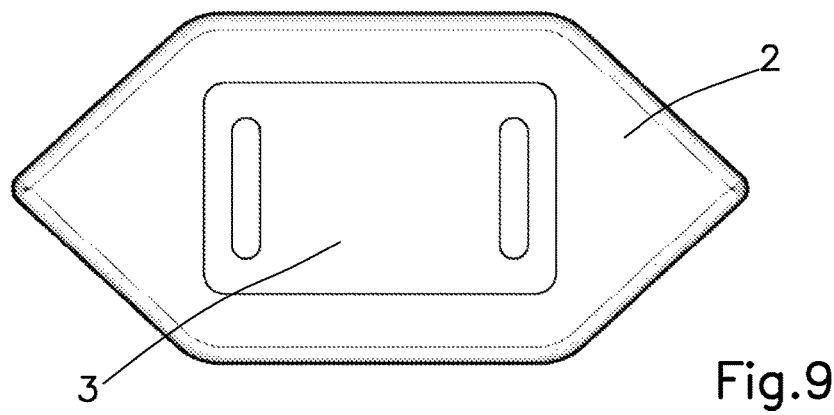
FIG. 9 shows a rear view of the device.
Figure 3:
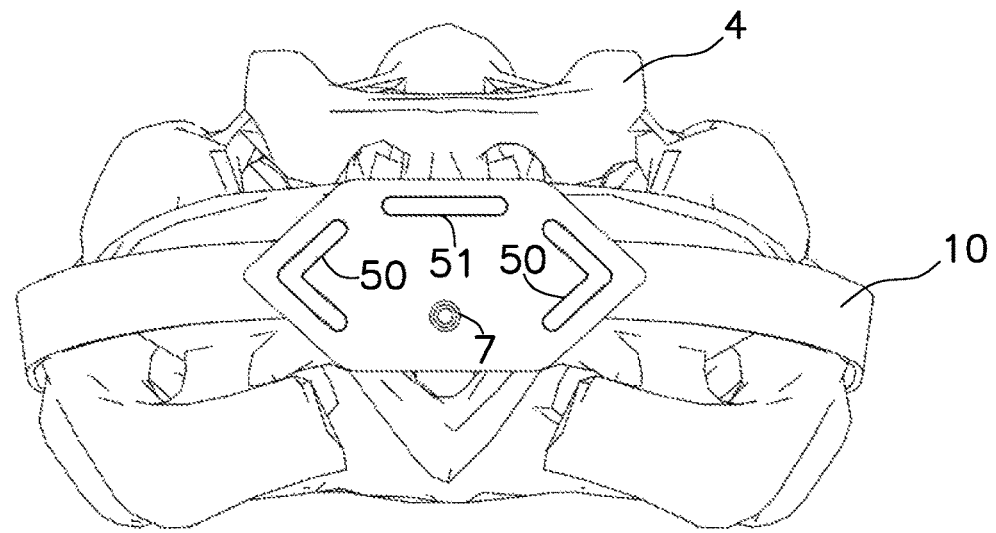
FIG. 3 shows a front view of the device mounted on a bike helmet.
Figure 4:
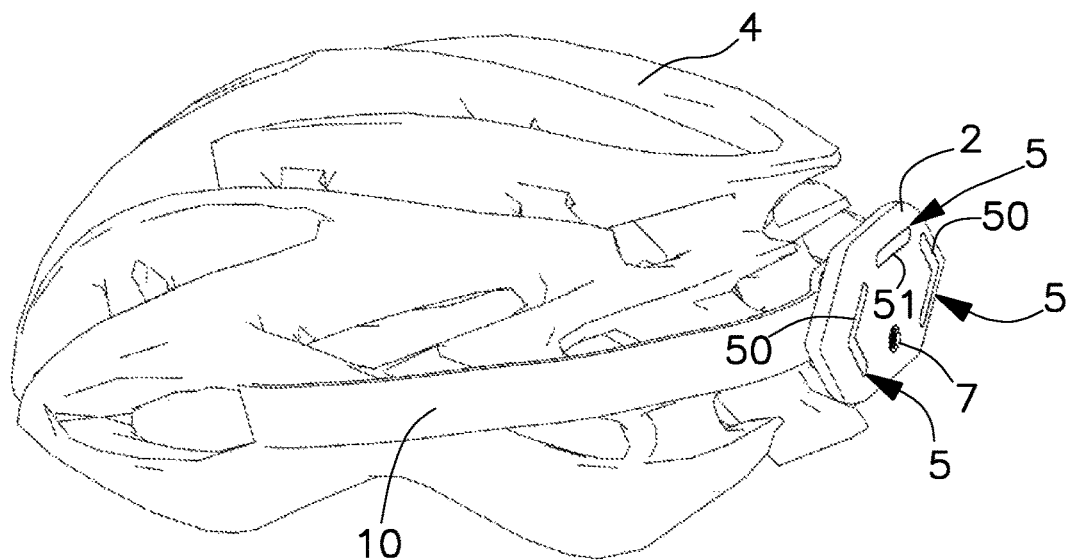
FIG. 4 shows a perspective view of the device mounted on a bike helmet.
Figure 6:
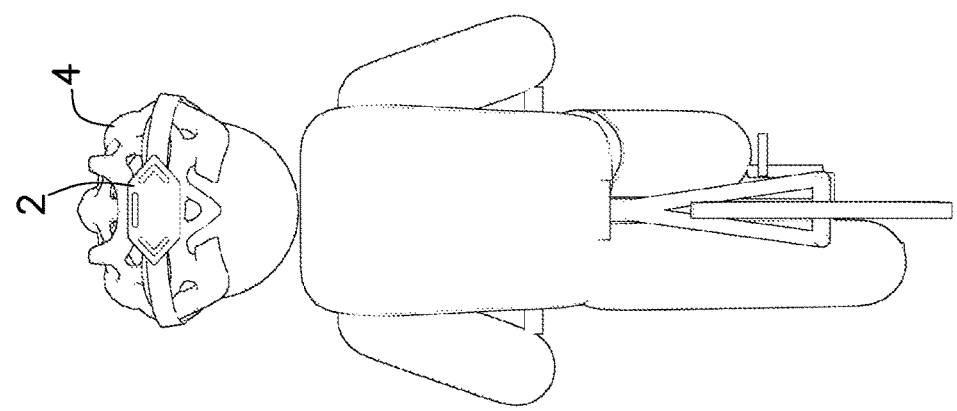
FIGS. 5 and 6 show respective views of the device in use.
Figure 5:
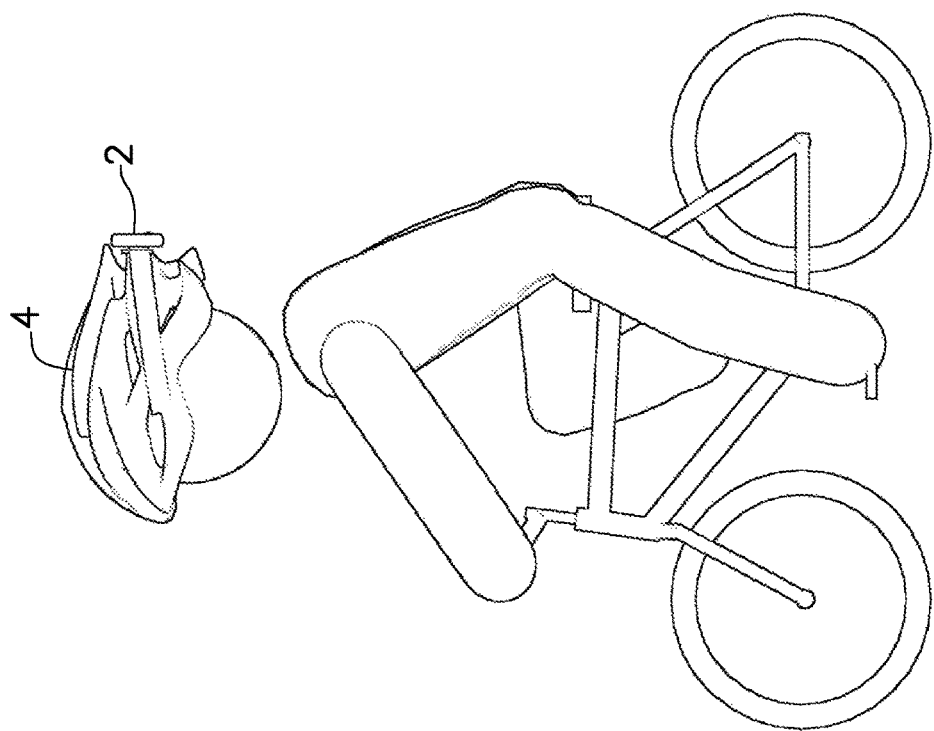
Figure 8:
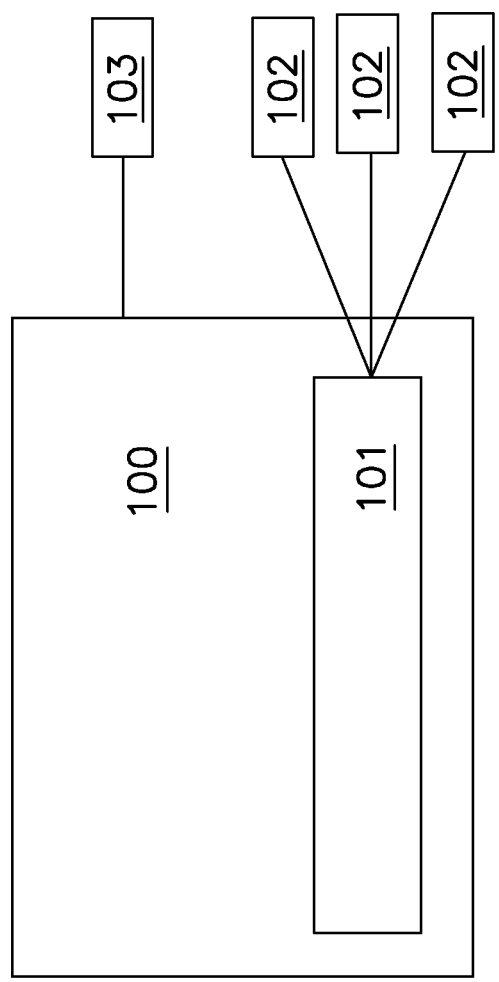
FIG. 8 shows a schematic view of some components of the device.
Figure 7:
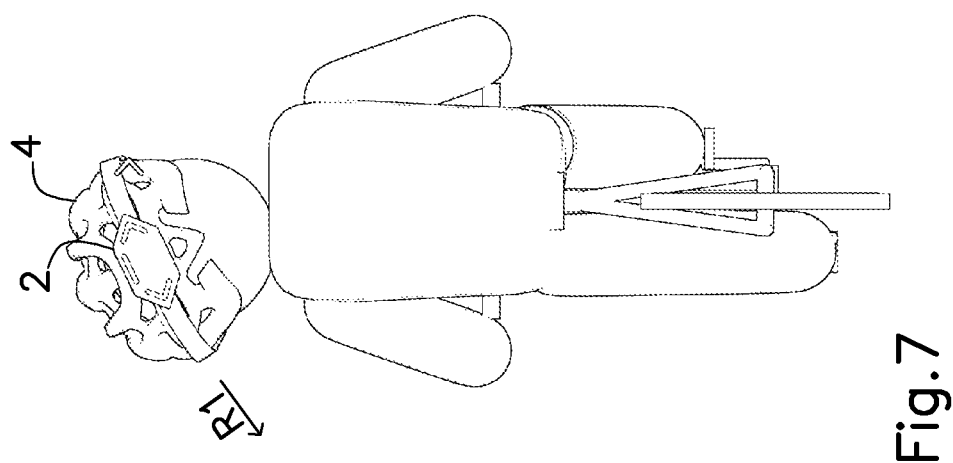
FIG. 7 shows a view of the device in a different use step.

With particular reference to such figures, the device for signalling direction according to the present invention is indicated in its entirety with 1.

The device is intended for being fastened, in use, to the head of a user, in particular of a cyclist.

The device comprises in particular a support 2 predisposed to be worn on the head of the user so as so move integrally with it.

In particular, the support 2 is provided with coupling means 3, of the type of hooks or belt loops, to be fixed to joining means 10 of the type of a band of elastic material, a suspender or the like, to be mounted in removable manner on a helmet 4. It is also possible to provide that the support 2 is manufactured integral to the helmet 4.

The support 2 has a prismatic shape, in particular it shapes end portions opposite and symmetric with respect to a median axis M that define each a V directed outwardly. The support 2 can anyway have different shapes, for example it can have elliptical or circular base surfaces. According to a preferred embodiment, the support 2 has a flattened shape and is shaped by two half-shells that define respective parallel base surfaces.

Preferably, on at least a portion of the support 2 a layer of refractive material is applied for increasing visibility, for example adhesive refractive material or a reflector pigment.

The support 2 is made of waterproof material or, alternatively, is suitably covered with a layer of waterproofing material, for example by a self-adhesive waterproofing membrane, which makes it resistant to water.

On a surface of the support 2 a plurality of light sources 5 are distributed, preferably LEDs. In particular, such light sources comprise at least a first direction light source 50 and a second direction light source 50, each being indicative of a respective rotation direction of said wearable support 2, as it is specified in the following.

The direction light sources 50 are placed at opposite portions of the support 2 with respect to a median axis M so as to be easily associated with the possible turning directions of the user.

According to a preferred embodiment, the device has a plurality of direction light sources 50 that define, at each end portion for the support 2, the profile of a V, so as to simulate an arrowhead directed to a side direction.

Alternatively, the direction light sources 50 can be made through respective LED strips that define, at each end portion of the support 2, the profile of a V.

According to a particularly preferred embodiment, the V profiles shaped by the direction light sources 50 are parallel to the V profiles shaped by the edges of the end portions of the support 2.

The light sources 5 preferably comprise at least one position light source 51, arranged in a central zone of the support 2, between the direction light sources 50.

Preferably, the device comprises a series of position light sources 51. In this way, the position light sources 51 can be used, besides for signalling the presence of the user, also for indicating the state of charge of the battery which powers the device, as it is better explained in the following. In the illustrated example, the position light sources 51 are made up of five LEDs aligned along a direction substantially perpendicular to the median axis M, but obviously, the number can be different.

Alternatively, the position light sources 51 can be made up of a LED strip.

It is possible to provide that the direction light sources 50 and the position light sources 51 are LEDs with different colours respectively, so as to easily distinguish them.

The light sources 5 are electrically connected with the control unit 100, housed in the support 2 and schematically shown in FIG. 10. The control unit 100 is predisposed to control the turning on and off of the light sources 5 according to the movements of the user, in particular according to the rotation of the head, as it is better explained in the following.

The control unit 100 comprises a microcontroller 101 which interfaces with suitable sensors 102, so as to receive in input the data acquired by the same sensors 102. In particular, the control unit 100 is configured to process an angular measurement of a rotation performed by the wearable support 2 and to control, in case said angular rotation measurement exceeds predetermined values, the selective turning on and off of said first direction light source 50 and of said second direction light source 50, so as to signal the rotation direction detected by said angular measure. The sensors 102 are associated with the support 2 and comprise at least one sensor element of the type of an accelerometer. Preferably, the sensors comprise an accelerometer and a gyroscope predisposed to measure respectively the acceleration and the angular speed of the support 2, i.e. of the head of the user, about three reference axes.

The sensors preferably comprise at least one brightness sensor predisposed to detect the value of the brightness level in the external environment and to transmit such value to the microcontroller to allow the adjustment of the brightness intensity of the light sources 5.

The microcontroller 101, starting from acceleration and/or angular speed values in input, sent by the sensors, is predisposed to calculate the value of the rotation angles of the support 2 with respect to the above-mentioned axes and to control, upon exceeding predetermined threshold values of the rotation angles, the activation of the direction light source 50 corresponding to the rotation direction of the angles and the turning off of the at least one position light source 51. Alternatively, the microcontroller 101 controls the turning off of the first or of the second direction light source 50 and the turning on of the at least one position light source 51.

In practice, when the inclination of the head of the user towards a first side direction R1 exceeds a predetermined threshold value for a predetermined reference time interval Δt0, the microcontroller controls the turning on of the direction light source 50 corresponding to the rotation direction and the turning off of the at least one position light source 51.

The first side direction R1 corresponds, in practice, to a right or left direction with respect to the position of the user.

According to a preferred embodiment, if the inclination of the head of the user towards a second direction R2 exceeds a predetermined threshold value for a reference time interval Δt0, the microcontroller controls the turning off of the first and or of the second direction light source 50 and turns on the at least one position light source 51.

The second direction R2 is substantially perpendicular to the first side direction R1, and corresponds to a forward or backward direction.

The device can be provided with an acoustic signalling device suitably interfaced with the microcontroller so as to associate a specific sound to the turning on and off of the light sources 5.

It is also possible to integrate a data transmission mode of the Bluetooth type to the device, so as to allow to put in communication the device with hardware devices such as smartphone, tablet, pc, and enable the configuration of the device through such devices.

The device is powered by an electric power supply device integrated to the support 2, in particular by an electric battery 103 housed in the support 2, schematically shown in FIG. 10.

The recharging of the battery is periodically carried out by connecting the device to an electric power source.

The device comprises at least one socket 6, preferably of μUSB type, predisposed to allow the above-mentioned connection through connection means, for example a cable provided with a suitable connector for the socket 6. In this way, it is possible to connect the device for signalling direction to different types of hardware devices, by using a cable provided at the opposite end with a connector fitted for a socket of USB type.

On the support 2 a control switch 7 is arranged predisposed to allow the turning on and off of the device upon operation of the user.

The functioning of the device for signalling direction is described in the following.

Firstly, the user operates the control switch 7 to start the device. In such step, the microcontroller operates the turning on of the light sources 5 in intermittent way for a predetermined time interval so as to check the correct functioning.

Subsequently, the position light sources 51 are turned on in proportion to the state of charge of the battery, that is, the number of turned-on LEDs is indicative of a pre-established percentage of charge of the battery. As an example, in the illustrated case, five turned on LEDs correspond to 100% charge, four LEDs correspond to 80% charge, three LEDs correspond to 60% charge, two LEDs 50% charge and one LED 20% charge. In case a position light source 51 is provided, such source is suitably configured to indicate the state of charge of the battery, for example through the emission of pulsed light of different duration, or of light of different colours according to the charge percentage of the battery.

The position light sources 51 signal the state of charge of the battery for a predetermined signalling time interval Δt2, preferably of 3-4 seconds, and are then turned off.

The user sets the wearable support 2 onto his head. At least one position light source 51 is turned on, in intermittent or continuous manner, to signal the position of the user.

When the user rotates his head, the values of the rotation angles about the three axes are calculated by the microcontroller 101 at each instant and compared to predetermined threshold values.

In the case of a rotation in a first side direction R1, for example towards right or left, if the angular rotation measurement exceeds predetermined threshold values for the reference time interval Δt0, the microcontroller 101 turns on the direction light source 50 corresponding to the rotation direction and turns off the at least one position light source 51. The direction right or left light source 50 remains turned on for a predetermined activation time interval Δt3, preferably 30-40 seconds. At the end of such activation time interval Δt3 the direction light source 50 is turned off, and the at least one position light source 51 is turned on.

In case, in the activation time interval Δt3, the user's head rotates in a second direction R2, for example, forward or backward, and the angular rotation measurement exceeds predetermined threshold values for the reference time interval Δt0, the microcontroller 101 turns on at least one position light source 51 and turns off the direction light source 50. After turning on the at least one position light source 51, if, in an inactivity time interval Δt4, preferably of about 5 minutes, no rotations are detected, the device turns to a power saving mode. This feature is particularly advantageous in the case where the user takes off the support 2 and such support 2 remains active, as it allows to optimize the energy consumption.

The device for signalling direction reaches the scope of enabling the user to signal the turning in safe easy an effective way.

As a matter of facts, the device, thanks to the sensors 102 and to the microcontroller 101 detects rotational movements made by the user and associates them to the turning on of the corresponding direction or position LEDs. In this way, it is possible to turn on the direction LEDs in the right or left direction by turning the head respectively to the right or to the left, avoiding manual gestures that may compromise the safety of the user, especially if he is a cyclist.

A prerogative of the present invention is that the device, having a simple structure and compact design, is easily wearable by the user. In the case of use of the device by a cyclist it is not therefore necessary to mount it on the bicycle, resulting in convenience of use and greater safety, avoiding the risk of theft or damage.

A further advantageous aspect is the fact that it is possible to signal the turning with appropriate advance with respect to the actual execution of the operation, simply by means of the rotational movements of the body part on which the device is fitted, so as to promptly warn the road users.

In the above-mentioned description, where it is specified that the lights 50 and 51 are turned on, it should be understood that they emit intermittent or continuous light, depending on the configuration of the device.

The device described by way of example is susceptible of numerous modifications and variations according to the different needs.

In practice, the used materials as well as the size and shape may vary according to the needs.

Should the technical characteristics mentioned in the claims be followed by reference signs, such reference signs were included for the sole purpose of increasing the understanding of the claims and thus they shall not be deemed limiting the scope of the element identified by such reference signs by way of example.

The invention claimed is:

1. A device for signaling direction, the device comprising:
a wearable support to be set onto a head of a user, on which said wearable support is worn, in use;
an electric power supply device housed in said wearable support;
at least one position light source, housed on said wearable support, configured to selectively signal between a state of charge of said electric power supply device, and a position of the user;
wherein said at least one position light source further comprises at least a first direction light source and a second direction light source, each of the first direction light source and the second direction light source indicating a respective direction of rotation of said wearable support and comprising a plurality of light emitting diode (LED) lights being indicative of a predetermined percentage of charge of said electric power supply device;
at least one sensor element associated with said wearable support, to measure one or more of at least one value of acceleration and at least one value of an angular speed acquired by said wearable support when said wearable support is worn on said head of the user;
a control unit electrically connected to said first direction light source and said second direction light source, said at least one sensor element being configured to send said one or more of at least one value of acceleration and one value of the angular speed to said control unit, said control unit being configured to process, based on a movement of the head of the user while wearing the wearable support, an angular measurement of rotation carried out by said wearable support and to control, upon exceeding predetermined values of said angular rotation measurement, a selective turning on or turning off of said first direction light source and of said second direction light source, so as to signal a direction of said rotation identified by said angular measurement, wherein light intensity illumination of said first and second direction light sources is determined based on the percentage of charge of said electric power supply device represented by a number of only turned-on LEDs, from the plurality of LED lights, said first direction light source and said second direction light source, said at least one sensor element and said control unit being housed on said wearable support.

2. The device according to claim 1, further comprising at least one brightness sensor predisposed to detect a value of a level of brightness in an external environment, and to transmit the value of the level of brightness to said control unit to allow adjustment of said light intensity illumination of said first direction light source, said second direction light source and said at least one position light source.

3. The device according to claim 1, wherein said wearable support has a flattened profile and shapes side portions opposite and symmetrical with respect to a median axis, said side portions having a shape of a V directed outwardly.

4. The device according to claim 3, wherein said first direction light source and said second direction light source are shaped so as to respectively shape, at each said end portion of said wearable support, the shape of a V directed outwardly.

5. The device according to claim 1, wherein said wearable support comprises a coupling means coupled with respective joining means to allow removable assembling to a cyclist helmet.

6. A cyclists helmet comprising:
a device for signaling direction;
the device comprising a wearable support to be set onto a head of a user, on which said wearable support is worn, in use;
an electric power supply device housed in said wearable support;
at least one position light source, housed on said wearable support, configured to selectively signal between a state of charge of said electric power supply device, and a position of the user;
wherein said at least one position light source further comprises at least a first direction light source and a second direction light source, at least one sensor element and a control unit, each of the first direction light source and the second direction light source indicating a respective direction of rotation of said wearable support and comprising a plurality of light emitting diode (LED) lights being indicative of a predetermined percentage of charge of said electric power supply device;
the at least one sensor element being associated with said wearable support, to measure one or more of at least one value of acceleration and at least one value of an angular speed acquired by said wearable support when said at least one sensor element is worn on said head of the user;
the control unit being electrically connected to said first direction light source and said second direction light source, said at least one sensor element being configured to send said one or more of at least one value of acceleration and one value of the angular speed to said control unit, said control unit being configured to process, based on a movement of the head of the user while wearing the wearable support, an angular measurement of rotation carried out by said wearable support and to control, upon exceeding predetermined values of said angular rotation measurement, a selective turning on or turning off of said first direction light source and of said second direction light source, so as to signal a direction of said rotation identified by said angular measurement, wherein light intensity illumination of said first and second direction light sources is determined based on the percentage of charge of said electric power supply device represented by a number of only turned-on LEDs, from the plurality of LED lights, said first direction light source and said second direction light source, said at least one sensor element and said control unit being housed on said wearable support.

7. The cyclists helmet according to claim 6, wherein a cyclist signals a position and any changes in direction of travel of the cyclist via the device.

8. A method for signaling direction, the method comprising the steps of:
(a). setting a wearable support of a device for signaling direction onto a head of a user;

(b). rotating said wearable support to a first side direction corresponding to a turning direction of the user;
(c). measuring one or more of at least one acceleration value and at least one value of an angular speed of said wearable support during, and based on, rotation of the head of the user while wearing said wearable support, and processing, starting from said one or more of at least one acceleration value and one value of angular speed, an angular value of the rotation of said wearable support in said first side direction and, if the angular value of said rotation exceeds a predetermined threshold value for a reference time interval, turning on at least one direction light source, associated with said wearable support, corresponding to said first side direction for an activation time interval, wherein light intensity illumination of said at least one direction light source is determined based on a percentage of charge of an electric power supply device, comprised in said wearable support, represented by a number of only turned-on LEDs, from a plurality of LED lights comprised on said one direction light source;
(d). turning off said at least one direction light source if said direction light source is turned on after said activation time interval.

9. The method according to claim 8, wherein after said step (c), the method further comprises the steps of:
rotating said wearable support in a second direction;
measuring the one or more of the at least one acceleration value and at least one value of the angular speed of said wearable support during said rotation, and
processing, starting from the one or more of at least one acceleration value and at least one value of angular speed, the angular value of the rotation of said wearable support in said second direction and, if the angular value of said rotation of said wearable support in said second direction exceeds a predetermined threshold value for a reference time interval, turning off said at least one direction light source.

10. The method according to claim 9, further comprising:
turning on said position light source when said at least one direction light source is turned off.

11. The method according to claim 8, wherein, before said step (a), the method further comprises the step of:
turning on at least one position light source for a signaling time interval to signal a state of charge of said electric power supply device of said device.

12. The method according to claim 8, further comprising the step of:
setting said device in a power saving mode if rotations of said wearable support are not detected in an inactivity time interval.

13. The method according to claim 8, further comprising:
turning on at least one position light source associated with said wearable support to signal a position of the user.

14. The method according to claim 13, further comprising:
turning off said position light source when said at least one direction light source is turned on.

15. The method according to claim 14, further comprising:
turning on said position light source when said at least one direction light source is turned off.

* * * * *